United States Patent [19]

Holbrook

[11] Patent Number: 5,160,750
[45] Date of Patent: Nov. 3, 1992

[54] DIFFERENTIAL PITCH THREAD CLAMP ASSEMBLY

[75] Inventor: James D. Holbrook, Maple Grove, Minn.

[73] Assignee: MTS Systems Corporation, Eden Prairie, Minn.

[21] Appl. No.: 745,417

[22] Filed: Aug. 15, 1991

[51] Int. Cl.$^5$ ............................................. B30B 15/00
[52] U.S. Cl. ................................ 425/451.9; 100/219; 425/595; 425/DIG. 221
[58] Field of Search ............... 100/214, 219; 425/406, 425/450.1, 451.9, 589, 590, 595, DIG. 221, DIG. 223

[56] References Cited

U.S. PATENT DOCUMENTS

| | | | |
|---|---|---|---|
| 4,509,910 | 4/1985 | Petersen | 425/451.9 |
| 4,846,614 | 7/1989 | Steinbock | 411/307 |
| 4,907,959 | 3/1990 | Hauch | 425/406 |

*Primary Examiner*—Jay H. Woo
*Assistant Examiner*—James P. Mackey
*Attorney, Agent, or Firm*—Kinney & Lange

[57] ABSTRACT

A clamp assembly for selectively friction clamping a member with respect to a column includes inner and outer threaded portions positioned concentrically around the column and within a housing attached to the member. The inner and outer threaded portions are threaded together to transfer force therebetween. A sealed chamber between the inner and outer threaded portions is selectively pressurized to cause an inner surface on the inner threaded portion to displace inwardly onto an outer surface of the column and the outer threaded portion displacing outwardly to provide frictional resistance to longitudinal movement of the member with respect to the column. The inner thread portion and the outer thread portion have a thread pitch difference to substantially compensate for strain deformation occurring thereupon.

16 Claims, 5 Drawing Sheets

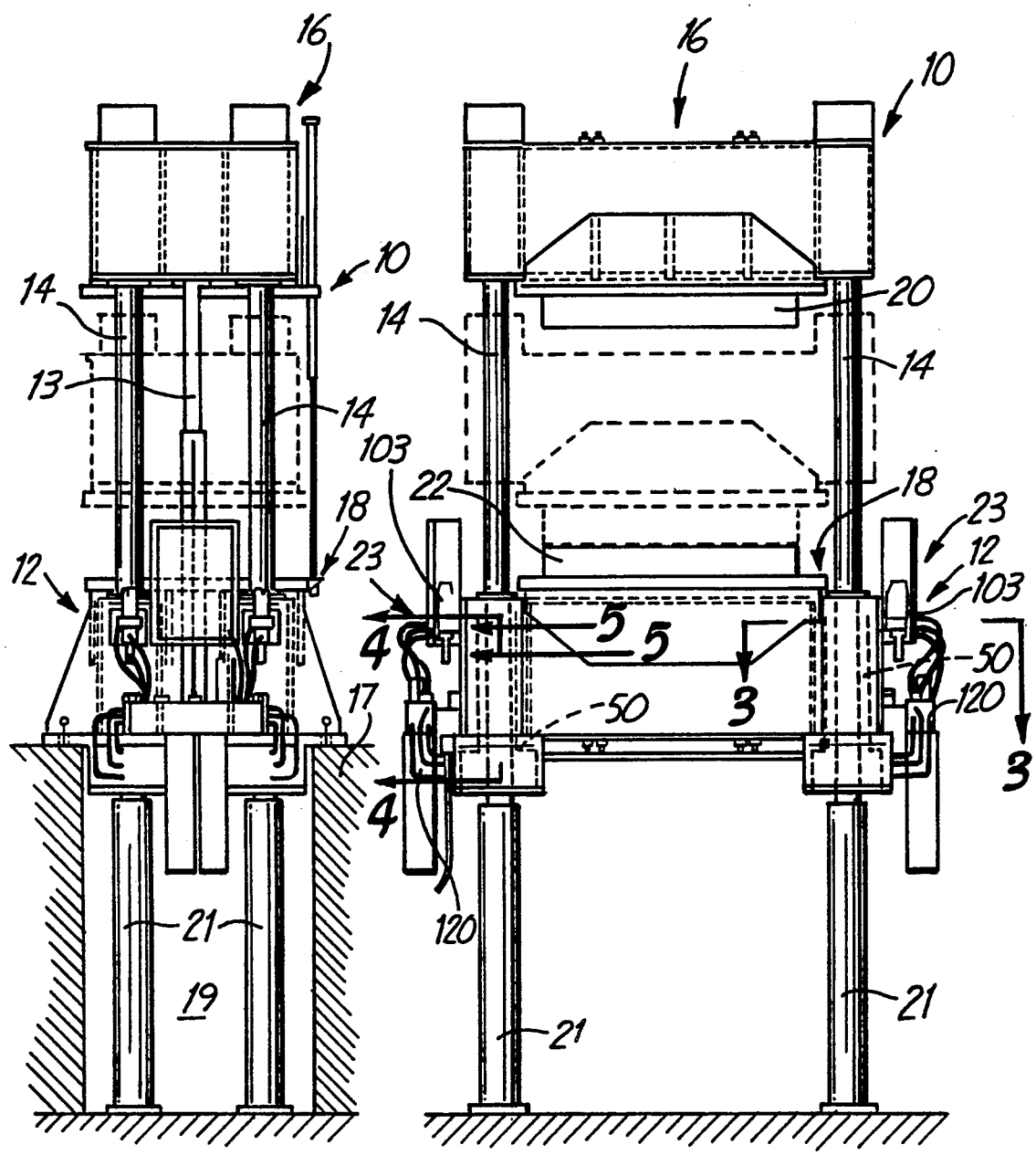

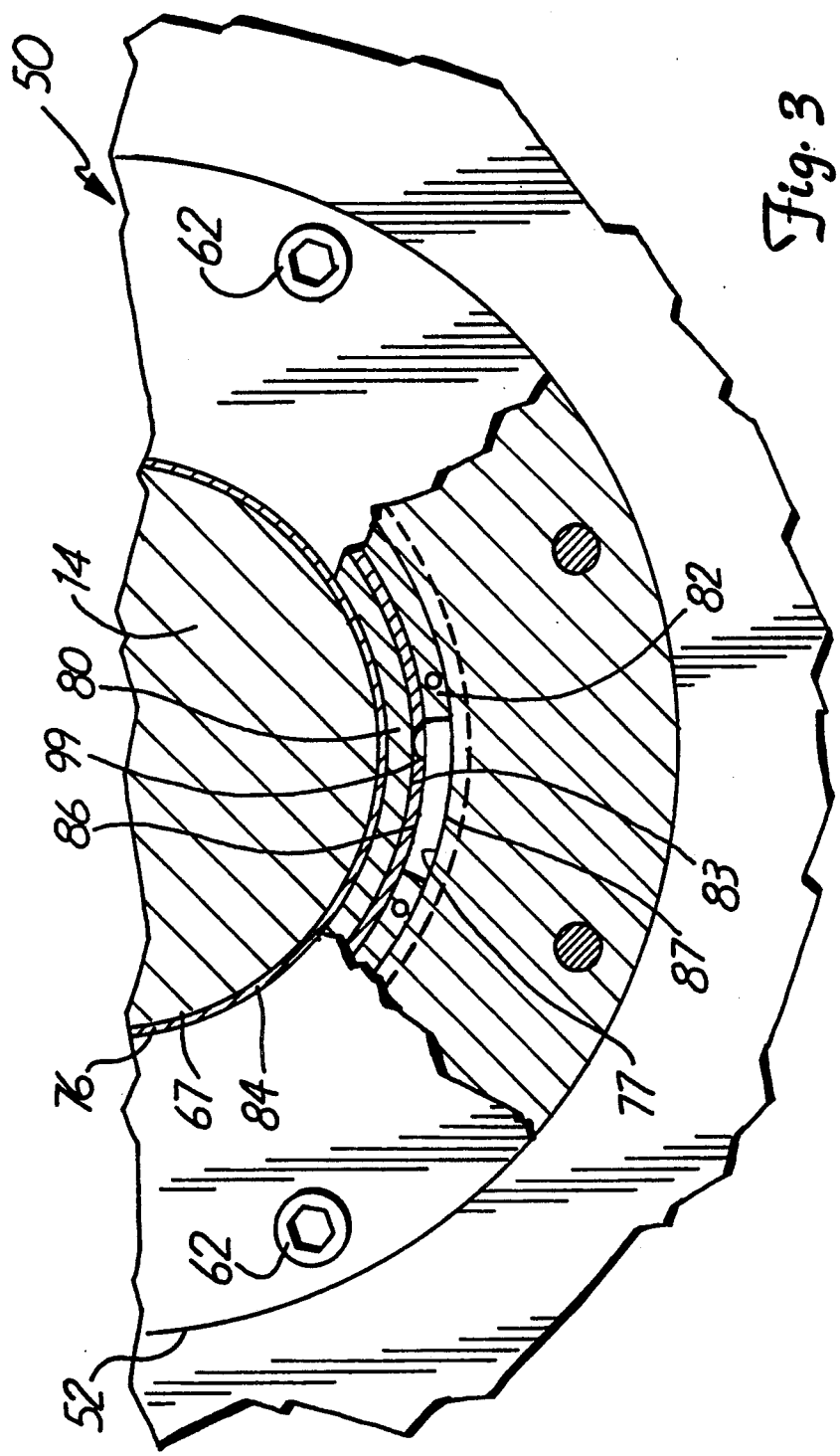

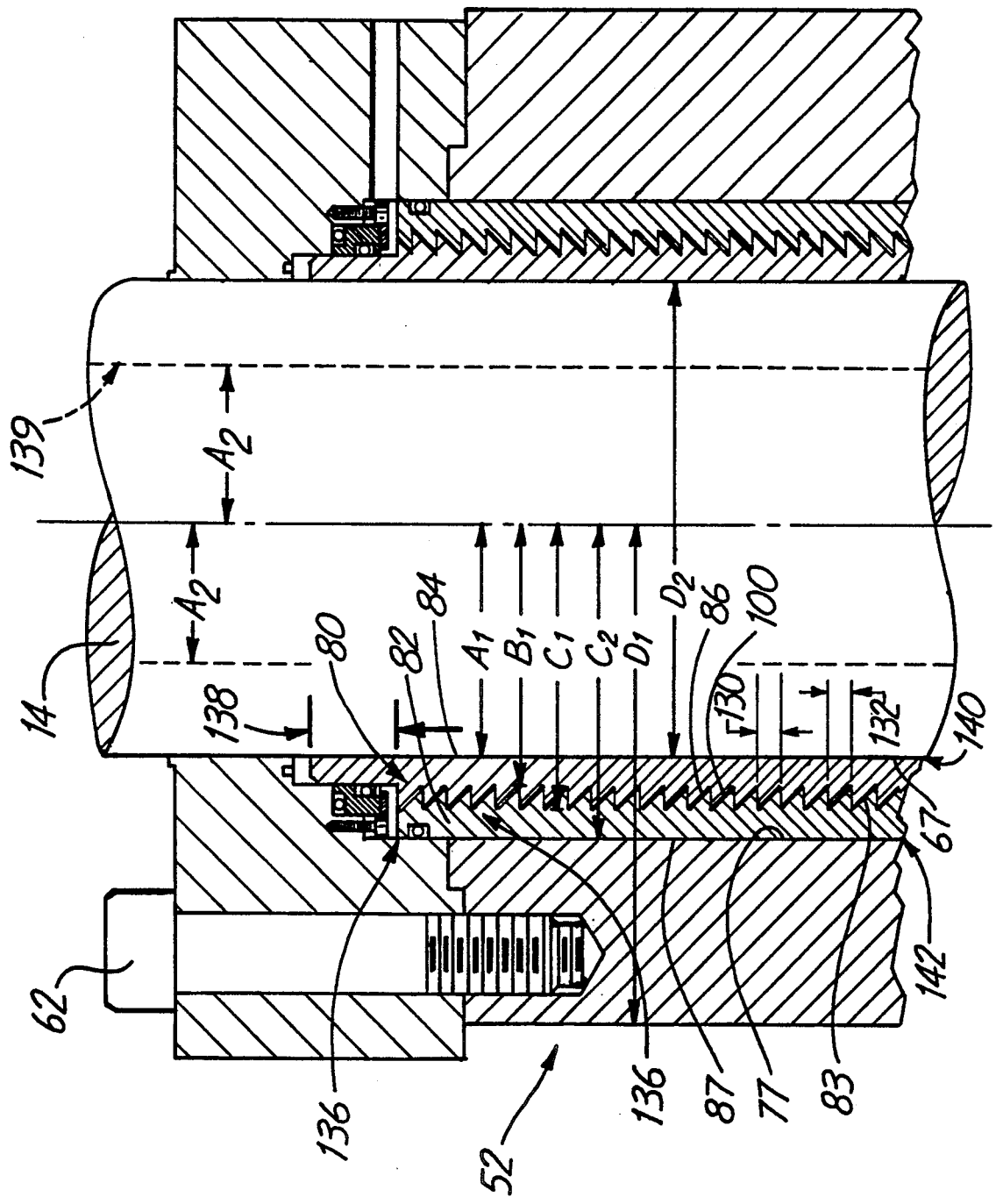

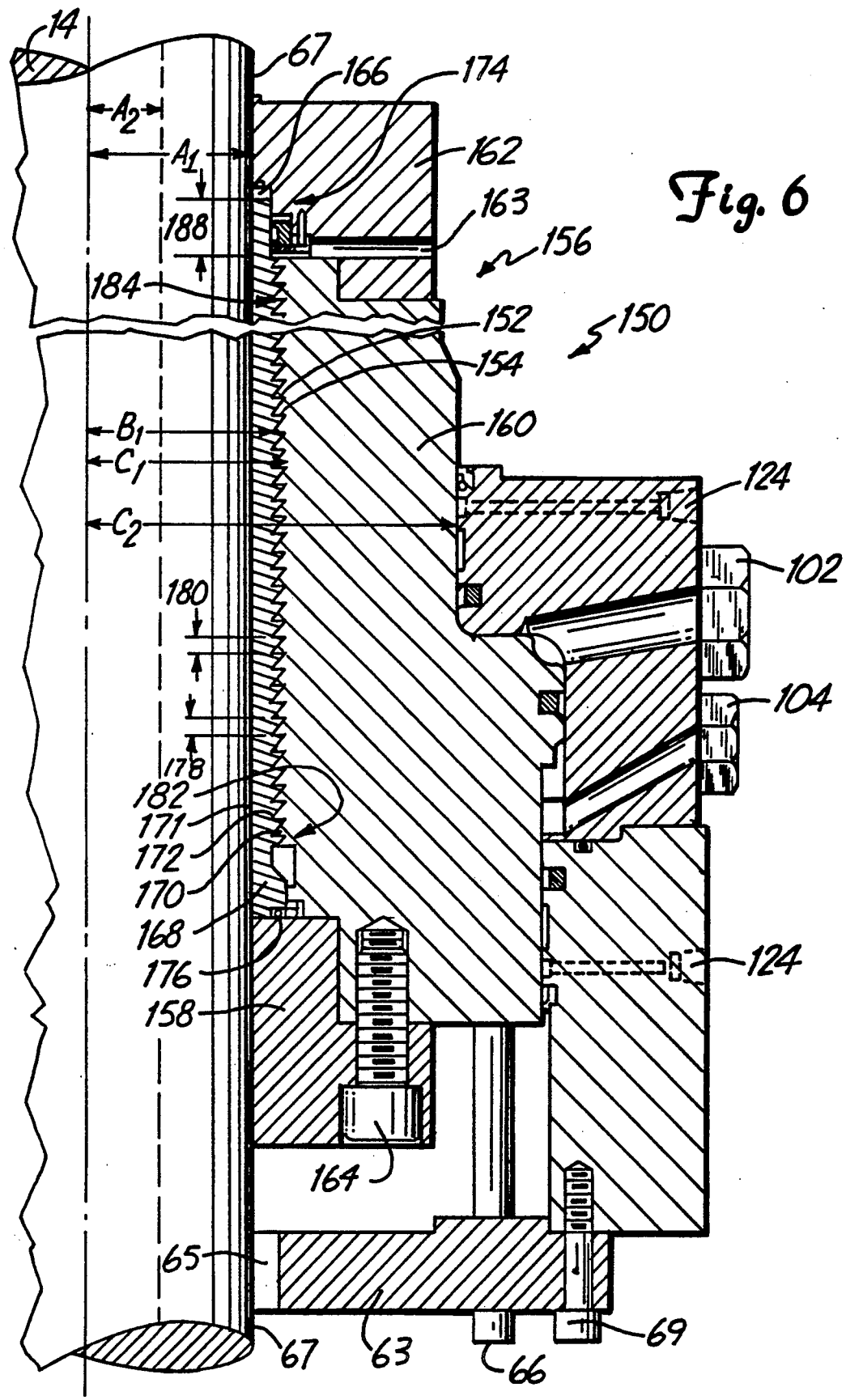

DIFFERENTIAL PITCH THREAD CLAMP ASSEMBLY

BACKGROUND OF THE INVENTION

The present invention relates to threaded column clamp assemblies used to secure a member with respect to a column and, more particularly, to a threaded clamp assembly having a differential pitch thread to distribute load forces on the threads.

In many types of presses, it is necessary to secure a movable crosshead of a press at one or more positions relative to a stationary member or base of the press. For example, injection molding machines commonly comprise a two-part mold, wherein one half of this mold is mounted on a lower platen while the other half is mounted on an upper movable platen or crosshead which allows the mold to be opened and closed. The mold is typically opened and closed with one or more driving ram or cylinder assemblies. Moldings are produced by injecting the material to be molded into the mold cavity under pressure. In the course of such injection, a force is built up which tends to separate the lower platen from the upper platen to open the mold. In order to prevent mold opening, the crosshead must be held stationary with respect to the base of the press with a force at least as strong as the force created by the injected material. However, rapid opening and closing of the mold is also desired in order to achieve economically advantageous production quantities.

Cylindrical threaded column clamps have proven to be an effective clamping apparatus to overcome such molding forces. One such column clamp assembly is disclosed in U.S. Pat. No. 4,509,910 issued to Petersen. The clamp assembly includes an inner clamp sleeve positioned concentrically about each column. The inner clamp sleeve is slidable with respect to a longitudinal column axis and has an upper unthreaded portion and a lower threaded portion. On a side opposite the threaded and unthreaded portions is an inner generally cylindrical surface for engaging the column. An outer threaded clamp sleeve is secured to the crosshead assembly and concentrically around the inner clamp sleeve. The inner and outer clamp sleeves are threaded together to limit longitudinal movement of one clamp sleeve with respect to the other. Although threaded together, there is sufficient clearance between the opposing threads of the inner and outer clamp sleeves to define a helical chamber. A hydraulic fluid system is provided for selectively introducing pressurized hydraulic fluid into the helical chamber. The pressurized hydraulic fluid causes the inner clamp sleeve to contract radially so that its inner cylindrical surface is urged substantially and uniformly against the column to limit longitudinal movement of the clamp assembly with respect to the column. When subjected to perpendicular loading forces such as injection mold forces, the interlocking threads of the inner and outer sleeves prevent longitudinal movement of the clamp assembly.

A second form of a column clamp assembly is disclosed in U.S. Pat. No. 4,907,959 issued to Hauch. The Hauch patent teaches a clamp assembly similar to that illustrated in the Petersen patent; however, the Hauch patent secures the clamp assembly to a base portion of the press while a plurality of columns are secured to a moveable crosshead wherein each column is positioned within the corresponding clamp assembly. The crosshead and attached columns are vertically adjusted with lift actuators positioned between a fixed portion of the press and the crosshead. When a desired crosshead position has been reached, hydraulic pressurized fluid operates each clamp assembly, in the manner taught by the Petersen patent and described above, to secure the crosshead position.

Although the clamp assemblies described above are effective clamping devices for columns of a press, the clamp assemblies appear to suffer from stress fatigue that can result in a relatively short useful life. Research by this inventor indicates that this stress is attributed to pressurization of the helical chamber between the inner and outer clamping sleeves wherein a slight difference in thread pitch between the inner and outer sleeves is caused by Poisson strain. Specifically, this research indicates that the thread pitch on the inner clamping sleeve increases slightly due to inward radial displacement of the inner sleeve against the column, and that the thread pitch on the outer sleeve decreases slightly due to outward radial displacement of that sleeve. With interlocking thread contact on a first or upper end of the clamp assembly when the clamp assembly is stationary and under load, such as mold injection loading, a relative pitch difference then accumulates over the longitudinal length of the clamp to produce a thread gap at a second or lower end of the clamp. Since the second end threads are not in contact with each other, a substantial amount of the load is applied to the first end threads which causes stress fatigue thereof that in turn reduces the life of the clamp.

In addition to higher stress loads on the first end threads due to Poisson strain of the inner and outer sleeves from the clamping pressures described above, increased force loads are further exerted on the first end threads. This additional force load, herein referred as "end-effect loading", is attributed to the unthreaded portion of the inner sleeve wherein frictional load forces between the inner surface of the unthreaded portion and the outer surface of the column are transferred to the first end threads. In other words, the first end threads are subjected to frictional load forces associated with the unthreaded portion of the inner sleeve as well as the frictional forces associated with its corresponding threaded portion. As with the unequal loading associated with the Poisson strain described above, this end-effect loading also contributes to stress fatigue of the first end threads which reduces the life of the clamp.

SUMMARY OF THE INVENTION

The present invention provides an improved clamp assembly for selectively friction clamping a member with respect to a column. The clamp assembly includes an inner clamp sleeve that is slidable longitudinally with respect to the column. The inner clamp sleeve comprises an inner surface for selectively engaging an outer surface of the column, and an outer surface. A housing portion is attached to the member and positioned about the inner clamp sleeve with a first portion that mates with the outer surface of the inner clamp sleeve to define a sealed chamber. In the preferred embodiment, the inner clamp sleeve mates with the first portion of the housing with interacting, opposed threaded portions wherein an inner threaded portion on the inner clamp sleeve has an inner thread pitch and an outer threaded portion on the first portion of the housing has an outer thread pitch. The thread pitches of the opposed threaded portions are unequal to define a thread pitch difference. The threaded portions mate concentrically about the column to limit movement of the clamp sleeve longitudinally with respect to the column and to define the chamber. The chamber is selectively pressurized with fluid from a suitable pressurizing device such as a pump. Pressurization of the chamber forces the inner surface of the inner clamp sleeve to engage the column.

The difference in thread pitch between the inner and outer threaded portions substantially compensates for unequal thread loading. In the preferred embodiment, the difference in thread pitch is equal to a first amount of thread pitch difference that substantially compensates for Poisson strain of the inner clamp sleeve and the outer threaded portion when the chamber is pressurized. In a further preferred embodiment wherein the inner clamp sleeve includes an inner unthreaded portion that produces end effect loading on the first end threads, a second amount of thread pitch difference is added to the first amount of thread pitch difference to substantially transfer the end effect loading from the first threads.

BRIEF DESCRIPTION OF THE DRAWINGS

FIG. 1 is a side elevational view of a hydraulic press including the improved column clamping assembly of the present invention;

FIG. 2 is a front elevational view of the press of FIG. 1;

FIG. 3 is a sectional view taken along lines 3—3 in FIG. 2;

FIG. 5 is a sectional view taken along lines 5—5 in FIG. 2; and

FIG. 6 is a sectional view of a second embodiment of the improved column clamp assembly of the present invention.

DETAILED DESCRIPTION OF THE PREFERRED EMBODIMENTS

Figure 4:
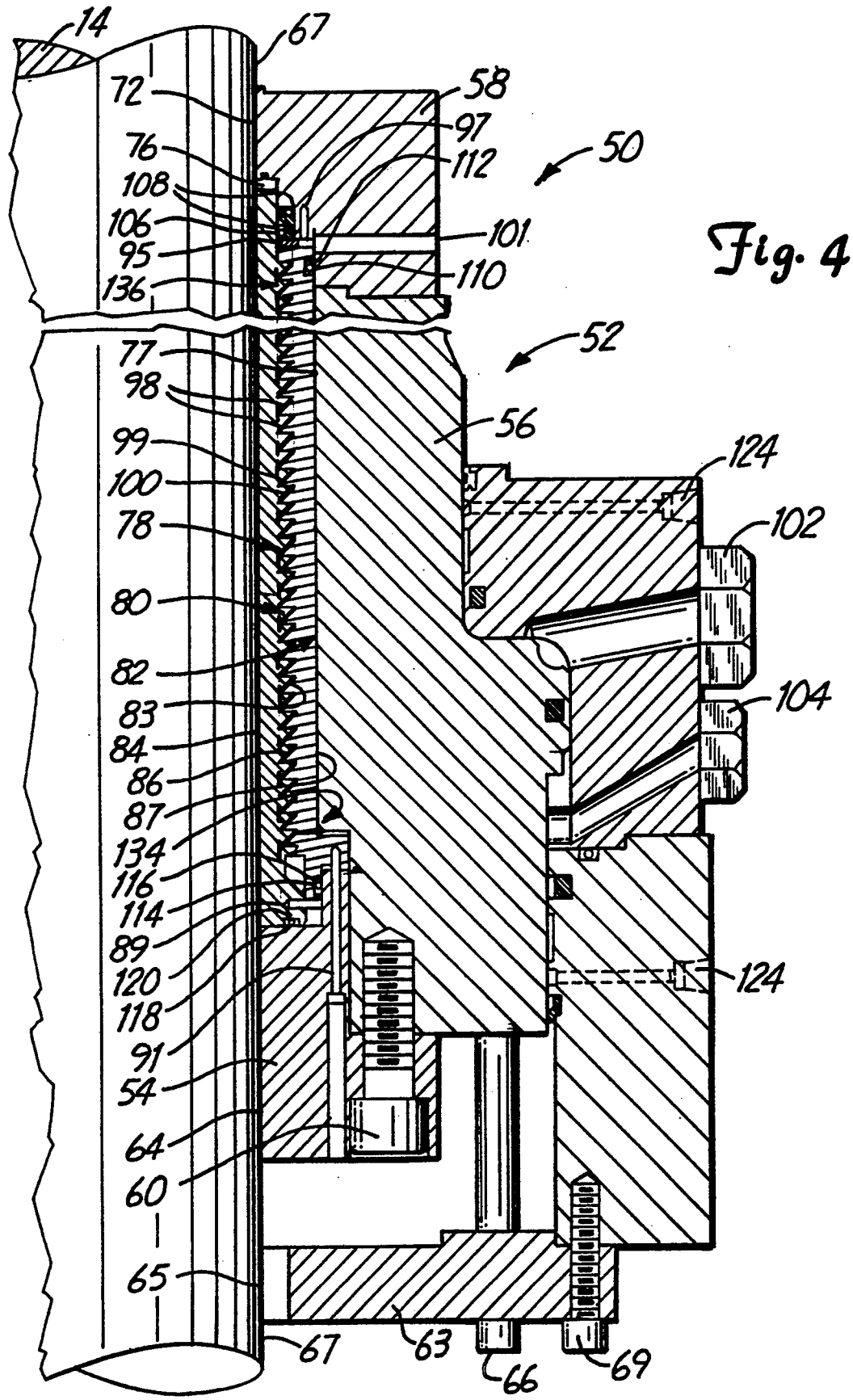
FIG. 4 is a sectional view taken along lines 4—4 in FIG. 2.

Referring generally to FIGS. 1 and 2, a molding press indicated generally at 10 is of a type similar to as shown in U.S. Pat. No. 4,907,959 with some changes in the column clamp assemblies described below. However, the general principle of operation is the same as that shown in U.S. Pat. No. 4,907,959, which is incorporated herein by reference, and therefore, the description herein following is schematic with regard to the overall press construction.

The compression molding press 10 is supported on a base 12, and includes four upright cylindrical columns 14, of which two are illustrated in each view, that are secured to and support an upper platen assembly or crosshead 16. Lifting means, which typically comprise a pair of hydraulic lift actuators 13 acting in parallel between the base 12 and the crosshead 16, move the crosshead 16 and the attached columns 14 vertically as desired. A lower platen assembly 18 is supported on the base 12. A compression molding assembly is typically mounted between the lower platen assembly 18 and the upper platen or crosshead 16. The assembly includes an upper mold member 20 and a lower mold member 22. The upper mold member 20 is bolted or otherwise mounted on the crosshead 16 in a conventional manner, and similarly, the lower mold member 22 is supported on the lower platen 18 in a conventional manner.

The base 12 is suitably supported on a mounting member, such as a concrete base 17, that has a recess 19 for accommodating the moveable columns 14 and which provides an adequate foundation for the press assembly 10. Protective sleeves indicated generally at 21 are provided in the recess 19 of the base 17. The sleeves 21 protect the lower ends of the columns 14 from damage when they protrude downwardly with downward operation of the lift actuators 13.

Power press and guidance modules 23 are mounted on each corner of the base 12 and slidably receive the columns 14. The modules 23 initiate a relatively short press stroke. Each module 23 has a clamp assembly 50 therein which is operated in response to control signals to releasably clamp onto the column 14 to hold the column 14 in a desired fixed position relative to the base 12.

As best shown in FIGS. 3, 4 and 5, each clamping assembly 50 includes a generally cylindrical housing portion 52 slidably fitted about its respective column 14. Each housing portion 52 includes three sections, a lower section 54, a central section 56 and an upper section 58. The lower section 54 and central section 56 are secured together by suitable fastening means such as a plurality of bolts 60 of which one is illustrated in FIG. 4. Similarly, the upper section 58 and central section 56 are secured together by suitable fastening means such as a plurality of bolts 62 illustrated in FIG. 5.

A lower annular bearing plate 63 is secured to a section of housing portion 52, and section 56 with a plurality of bolts 66 and 69, respectively. The bearing plate 63 has an inner cylindrical surface 65 that slidably engages an outer cylindrical surface 67 of the column 14. A similar upper annular bearing plate, not shown, that is secured to base 12 also mates with the outer cylindrical surface 67. The inner surface 65 and a similar inner surface of the upper bearing plate preferably consist of nylon or some similar low friction material to facilitate the sliding of column 14 with respect to the clamping assembly 50.

When the housing portion 52 is positioned about the column 14, a cylindrically shaped chamber 76 is defined between the outer cylindrical surface 67 of the column 14, the upper section 58, the lower section 54 and an inner surface wall 77 of housing portion 52 as illustrated in FIG. 4. The majority of the chamber 76 is occupied by a pair of co-acting portions of a clamping assembly 78, having an elongated, cylindrical inner clamp sleeve 80 and an elongated, cylindrical outer clamp sleeve 82.

The inner clamp sleeve 80 is positioned concentrically about the column 14 and slidable longitudinally with respect thereto. The inner clamp sleeve 80 has an outer threaded surface 83 and an inner generally cylindrical surface 84 which selectively mates with the outer surface 67 of the column 14.

The outer clamp sleeve 82 is also generally cylindrical and positioned concentrically about the column 14 and the inner clamp sleeve 80. The outer clamp sleeve 82 has an inner threaded surface 86 and an outer cylindrical surface 87. The outer surface 87 of the outer clamp sleeve 82 selectively mates with the inner surface 77 of the housing portion 52. The outer clamp sleeve 82 is fixed in position longitudinally with respect to the housing 52 by suitable means, such as bolts 91, that engage outer sleeve 82 through lower section 54.

The inner and outer clamp sleeves 80 and 82 are threaded together by the threaded surface portions 83 and 86 thereon, respectively. The threaded portions 83 and 86 extend helically and concentrically with respect to the column 14. When the clamp sleeves 80 and 82 are threaded together, the threaded surface portions 83 and 86 mate together generally as illustrated in FIG. 4 so that longitudinal movement of one clamp sleeve with respect to the other is limited. A threaded pin 89 connects a lower portion of outer clamp sleeve 82 with a lower portion of inner sleeve 80. Pin 89 interlocks outer clamp sleeve 82 with inner clamp sleeve 80 to prevent rotational movement therebetween.

In the preferred embodiment, the inner and outer clamp sleeves 80 and 82 are threaded together with a 90° contact angle buttress thread with relatively large annular clearances 98 between the opposing thread surfaces. The clearances 98 are illustrated in FIG. 4, which also shows that the engaging portions of the 90° contact angle buttress thread are perpendicular with respect to the axis of the column 14. The clearances 98 are sufficiently large to define a helical chamber 100 concentrically about the column 14 extending the entire longitudinal length of the threaded engagement of the inner and outer clamp sleeves 80 and 82. A hydraulic port 101 communicates with the helical chamber 100. Port 101 is connected to a suitable control valve assembly 103, illustrated in FIG. 2, that selectively controls the flow of hydraulic fluid to operate the clamp assembly 50. Hydraulic ports 102 and 104 are connected to a servovalve 122, illustrated in FIG. 2, that selectively provides hydraulic fluid to module 23 in order to initiate a relatively short press stroke after the clamp assemblies 50 have been clamped to their respective columns 14. Drain ports 124 within housing 52 drain excess hydraulic fluid that accumulates on the outer surface of housing section 56.

A sealing ring retainer 95 retains a floating seal ring 97 for sealing the upper end of chamber 76. In addition to the seal ring 97, a plurality of O-rings 106 are concentrically retained in annular cavities 108 between the seal ring 97 and the inner clamp sleeve 80 and between the seal ring 97 and the upper section 58, respectively. An O-ring 110 is also concentrically retained in an annular cavity 112 between outer surface 87 of the outer clamp sleeve 82 and the inner surface 77.

Similarly, the lower end of chamber 76 is sealed with a plurality of O-rings. An O-ring 114 is concentrically retained in an annular cavity 116 between the outer clamp sleeve 82 and the lower section 54 while an O-ring 118 is concentrically retained in an annular cavity 120 in inner clamp sleeve 80. Bolts 91, secured to outer clamp sleeve 82 through lower section 54, are adjusted to preload O-ring 118.

Helical drain grooves, not shown, formed in the inner surface 84 of the inner clamp sleeve 80 and the outer surface 87 of the outer clamp sleeve 82 provide means for drawing away excess lubricating or tramp oil from the elements of the column clamping assembly 50 during clamping operations.

The column clamping assembly 50 of the present invention is actuated by the introduction of pressurized hydraulic fluid into the helical chamber 100 between the inner and outer clamp sleeves 80 and 82. The presurized fluid causes the inner clamp sleeve 80 to displace radially inward under Poisson strain so that the inner surface 84 thereof uniformly engages the outer surface 67 of the column 14. The fluid pressure further causes the outer clamp sleeve 82 to displace radially outward under Poisson strain so that the outer surface 87 thereof uniformly engages the inner surface 77 of housing section 56.

The engaging surface portions of the buttress threaded portions 83 and 86 of the inner and outer clamp sleeves 80 and 82 prevent axial movement of the outer clamp sleeve 82 with respect to the inner clamp sleeve 80. Thus, when the inner clamp sleeve 80 is displaced radially inward against the column 14, movement of the outer clamp sleeve 82 is also secured to the column 14 to limit longitudinal movement with respect thereto.

To release the gripping force of the column clamping assembly 50 on the column 14, control valve assembly 103 is actuated to open the port 101 to exhaust fluid and return the chamber 100 to reduced pressure. This allows the inner clamp sleeve 80 to displace radially outward and outer clamp sleeve 82 to displace radially inward to their normal configurations, a combined configuration which allows sufficient clearance between the facing surfaces 84 and 67 of the inner clamp sleeve 80 and column 14, respectively, to permit the column 14 to slide longitudinally with respect to the column clamp assembly 50.

In the preferred embodiment, eight longitudinal channels 99, illustrated in FIGS. 3 and 4, are formed with equal angular spacings in the inner clamp sleeve 80 around the column 14. The longitudinal channels 99 interconnect the thread roots of inner clamp sleeve 80 and open to the outer threaded surface 83. The longitudinal channels 99 allow rapid pressure equalization within the helical chamber 100 to increase the speed of both clamping and unclamping operations.

As stated above, pressurizing the helical chamber 100 between the inner 80 and outer 82 clamping sleeves causes slight deformation of the clamping sleeves due to Poisson strain which in turn causes a slight change in thread pitch. Referring to FIG. 5, an inner sleeve thread pitch is defined by double arrow 130 and an outer sleeve thread pitch is defined by a double arrow 132. In clamp assemblies such as the assemblies disclosed in U.S. Pat. No. 4,509,910 and 4,907,959 summarized above, the inner thread pitch 130 substantially equals that of outer thread pitch 132. With hydraulic pressurization of the helical chamber 100, the inner thread pitch 130 increases slightly due to inward radial displacement of the inner sleeve 80 under Poisson strain against the column 14 while the outer thread pitch 132 decreases slightly due to outward radial displacement of the outer sleeve 82 under Poisson strain against portions of the housing 56. The thread pitch difference, over a longitudinal length of the threaded inner and outer sleeves, produces a thread gap, not shown, on a second end 134 illustrated in FIG. 4, when there is thread contact on a first end 136 thereof. A substantial load builds up on the corresponding threads of the first end 136 before sufficient load is picked up by corresponding threads of the second end 134.

Besides the stress that is associated with Poisson strain, described above, an additional second component of stress is applied to threads of the first end 136. The second component of stress is associated with a longitudinal length portion defined by double arrow 138 on the inner sleeve 80 illustrated in FIG. 5. Since there is no threaded portion associated with this portion 138 of the inner sleeve 80 to transfer the corresponding frictional force between outer column surface 67 and inner clamp surface 84, these frictional forces are carried by the threads associated with the first end 136, adding to the stress produced by Poisson strain.

In the present invention, expansion of the inner 80 and outer 82 sleeve due to the Poisson strain described above, that results in partially or non-interlocking threads on the clamping assembly is compensated by varying the thread pitch between the inner and outer threaded sleeves.

The following equations are used to approximate clamping pressures and component deformation present on a typical clamp assembly described above and illustrated in FIGS. 1 through 5 and to further determine a suitable thread pitch difference, or "thread pitch differential," between the inner 80 and outer 82 sleeves that will substantially compensate for deformation thereof. With slight modification to be described below, the following equations can be used to calculate the thread pitch differential for a clamp assembly that engages a hollow column.

Referring to FIG. 5, and assuming a clamp assembly operating pressure, herein represented as "P", present within the helical chamber 100, three pressures can be defined that exert pressure upon the inner sleeve 80. A first pressure, herein referred as "$P_1$", is directed radially toward the column 14 and represents the pressure required to deflect the inner sleeve 80 against the column 14 as determined from the following equation:

$$P_1 = \frac{X_1 E_{is}(B_1^2 - A_1^2)}{2B_1^2 A_1} \qquad \text{Equation 1}$$

where, $X_1$ represents a radial distance 140 from the column outer surface 67 to the inner surface 84 of the inner sleeve 80; $A_1$ represents a radial distance from the inner sleeve 80; $A_1$ represents a radial distance from the center of the column 14 to the inner surface 84; $B_1$ represents a radial distance from the center of the column 14 to the innermost channel, or thread root, of the inner sleeve 80; and $E_{is}$ represents the modulus of elasticity for the material forming the inner sleeve 80.

With $P_1$ determined from Equation 1, a second pressure, herein referred as "$P_2$", represents the pressure exerted upon the outer threaded surface 83 of the inner sleeve 80 and is determined from the following equation:

$$P_2 = P - P_1 \qquad \text{Equation 2}$$

Next, by defining "$P_3$" as the pressure present between the inner surface 84 of the inner sleeve 80 and the outer surface 67 of the column 14, and by equating strain compression of the column 14 from $P_3$ with strain compression of the inner sleeve 80 from $P_2$ and $P_3$, the following equation is formed:

$$\frac{P_3(1 - V_c)A_1}{E_c} = \qquad \text{Equation 3}$$

$$\frac{P_2(2)A_1B_1^2}{E_{is}(B_1^2 - A_1^2)} - \frac{P_3(A_1)}{E_{is}} \left( \frac{B_1^2 + A_1^2}{B_1^2 - A_1^2} + V_{is} \right)$$

where $V_c$ and $E_c$ represent the Poisson strain constant and modulus of elasticity for the material comprising the column 14, respectively, and $V_{is}$ represents the Poisson strain constant for the material comprising the inner sleeve 80.

Solving Equation 3 for $P_3$, the pressure present between the inner sleeve inner surface 84 and the column outer surface 67 is represented by the following equation:

$$P_3 = \frac{P_2(2)B_1^2}{E_{is}(B_1^2 - A_1^2)} \bigg/ \left[ \frac{1 - V_c}{E_c} + \left( \frac{\frac{B_1^2 + A_1^2}{B_1^2 - A_1^2} + V_{is}}{E_{is}} \right) \right] \qquad \text{Equation 4}$$

Having obtained a value for $P_3$ from Equation 4, a total radial distance deflection of the inner sleeve 80, herein referred as "$X_2$", can be then determined from $X_1$, the radial distance from the column outer surface 67 to the inner surface 84 of the inner sleeve 80; and a distance representing compression of the column 14 according to the following equation:

$$X_2 = X_1 + \frac{P_3(1 - V_c)A_1}{E_c} \qquad \text{Equation 5}$$

Equations 3, 4 and 5 are formulated based on a solid column having an inner radius $A_1$. Alternatively, if a hollow column is to be used, Equations 3, 4 and 5 must be reformulated to account for deformation of the hollow column. The following equation equates the strain compression of the hollow column from $P_3$, which again represents the pressure present between the inner surface 84 of the inner sleeve 80 and the outer surface 67 of the hollow column, with strain compression of the inner sleeve 80 from $P_2$ and $P_3$;

$$\frac{P_3(2)A_1A_2^2}{E_c(A_1^2 - A_2^2)} = \qquad \text{Equation 3A}$$

$$\frac{P_2(2)A_1B_1^2}{E_{is}(B_1^2 - A_1^2)} - \frac{P_3(A_1)}{E_{is}} \left( \frac{B_1^2 + A_1^2}{B_1^2 - A_1^2} + V_{is} \right)$$

where $A_2$ represents an inner radius that defines an inner cylindrical portion 139; $V_c$ and $E_c$ represent the poisson strain constant and modulus of elasticity for the material comprising the hollow column, respectively, and $V_{is}$ represents the Poisson strain constant for the material comprising the inner sleeve 80.

Solving Equation 3A for $P_3$, the pressure present between the inner sleeve inner surface 84 and the column outer surface 67 is represented by the following equation:

$$P_3 = \qquad \text{Equation 4A}$$

$$\frac{P_2(2)B_1^2}{E_{is}(B_1^2 - A_1^2)} \bigg/ \left[ \frac{A_2^2(2)}{E_c(A_1^2 - A_2^2)} + \left( \frac{\frac{B_1^2 + A_1^2}{B_1^2 - A_1^2} + V_{is}}{E_{is}} \right) \right]$$

Having obtained a value for $P_3$ from Equation 4A, a total radial distance deflection of the inner , sleeve 80, herein referred as "$X_2$", can be then determined from $X_1$, the radial distance from the column outer surface 67 to the inner surface 84 of the inner sleeve 80; and a distance representing compression of the column 14 according to the following equation:

$$X_2 = X_1 + \frac{P_3(2)A_1A_2{}^2}{E_c(A_1{}^2 - A_2{}^2)}$$

Equation 5A

From Equation 5 or Equation 5A and determination of $X_2$, a change in thread pitch for the inner sleeve 80 that is associated with Poisson strain, herein referred as "$\Delta T_i$", is represented by the following equation:

$$\Delta T_i = \frac{X_2(V_{is})T}{A_1}$$

Equation 6 where T represents the nominal thread pitch of the inner sleeve 80.

The change in thread pitch of the outer sleeve 82 can be calculated with a similar procedure. Again with reference to FIG. 5, and assuming a clamp assembly operating pressure P, present within the helical chamber 100, three pressures can be defined that exert pressure upon the outer sleeve 82. A first pressure, herein referred as "$P_4$", is directed radially outward from the column 14 and represents the pressure required to deflect the outer sleeve 82 against the housing inner surface 77 as determined from the following equation:

$$P_4 = \frac{X_{11}(E_{os})(C_2{}^2 - C_1{}^2)}{2(C_2)C_1{}^2}$$

Equation 7 where, $X_{11}$ represents a radial distance 142 from the housing inner surface 77 to the outer surface 87 of the outer sleeve 82; $C_2$ represents a radial distance from the center of the column 14 to the outer sleeve outer surface 87; $C_1$ represents a radial distance from the center of the column 14 to the outermost channel, or thread root, of the outer sleeve 82; and $E_{os}$ represents the modulus of elasticity for the material forming the outer sleeve 82.

With $P_4$ determined from Equation 7, a fifth pressure, herein referred as "$P_5$", represents the pressure exerted upon the inner threaded surface 86 of the outer sleeve 82 and is determined from the following equation:

$$P_5 = P - P_4$$

Equation 8

Next, by defining "$P_6$" as the pressure present between the outer surface 87 of the outer sleeve 82 and the inner surface 77 of the housing 52, and by equating strain compression of the housing 52 from $P_6$ with strain compression of the outer sleeve 82 from $P_5$ and $P_6$, the following equation can be formed:

$$\frac{P_6C_2}{E_{oh}}\left(\frac{D_1{}^2 + C_2{}^2}{D_1{}^2 - C_2{}^2} + V_{oh}\right) = \frac{(2)P_5(C_2)C_1{}^2}{E_{os}(C_2{}^2 - C_1{}^2)} - \frac{P_6C_2}{E_{os}}\left(\frac{C_2{}^2 + C_1{}^2}{C_2{}^2 - C_1{}^2} - V_{os}\right)$$

Equation 9 where $V_{oh}$ and $E_{oh}$ represent the Poisson strain constant and modulus of elasticity for the material comprising the housing 52, respectively, and $V_{os}$ represents the Poisson strain constant for the material comprising the outer sleeve 82.

Solving Equation 9 for $P_6$, the pressure present between the outer sleeve outer surface 87 and the housing inner surface 77 is represented by the following equation:

$$P_6 = \left[\frac{(2)P_5C_1{}^2}{E_{os}(C_2{}^2 - C_1{}^2)}\right] \Big/ \left[\frac{1}{E_{oh}}\left(\frac{D_1{}^2 + C_2{}^2}{D_1{}^2 - C_2{}^2} + V_{oh}\right) + \frac{1}{E_{os}}\left(\frac{C_2{}^2 + C_1{}^2}{C_2{}^2 - C_1{}^2} - V_{os}\right)\right]$$

Equation 10

Next, a total radial distance deflection of the outer sleeve 82, herein referred as "$X_3$", can be determined from $X_{11}$, the radial distance 142 from the housing inner surface 77 to the outer surface 87 of the outer sleeve 82; and a distance representing compression of the housing 52 according to the following equation:

$$X_3 = X_{11} + \frac{P_6C_2}{E_{oh}}\left(\frac{D_1{}^2 + C_2{}^2}{D_1{}^2 - C_2{}^2} + V_{oh}\right)$$

Equation 11

From Equation 11 and determination of $X_3$, a change in thread pitch for the outer sleeve that is associated with Poisson strain, herein referred as "$\Delta T_o$", is represented by the following equation:

$$\Delta T_o = \frac{X_3(V_{os})T}{C_2}$$

Equation 12 where T again represents the nominal thread pitch of the inner sleeve 80 which corresponds to the nominal thread pitch of the outer sleeve 82.

From Equation 6 and Equation 12, a total thread pitch differential due to the Poisson strains exerted upon the inner 80 and outer 82 sleeves, herein referred as "$\Delta T$", is equal to the sum total of $\Delta T_i$ and $\Delta T_o$ as represented by the following equation:

$$\Delta T = \Delta T_i + \Delta T_o$$

Equation 13

To transfer the end effect loading, described above, from the first end threads 136 and substantially distribute that load to other lower portions of the threaded inner 80 and outer 82 sleeves, additional second thread pitch different is added to the result obtained in Equation 13. In the preferred embodiment, this additional thread pitch difference is equal to the thread pitch difference necessary to compensate for Poisson strain on the inner 80 and outer 82 sleeves; therefore, a total thread pitch difference necessary to compensate for both Poisson strain of the inner 80 and outer 82 sleeves and end effecting loading is equal to twice the result obtained from Equation 13.

The total thread difference necessary to compensate for Poisson strain of the inner 80 and outer 82 sleeves and end effect loading, or if desired, only for the Poisson strain of the inner 80 and outer 82 sleeves, can be apportioned in any desired amount between the inner thread pitch 130 and outer thread pitch 132 wherein a portion of the total thread pitch differential is subtracted from the nominal thread pitch of the inner sleeve 80 thereby increasing the number of threads in a given linear length and the remaining portion of the total thread pitch differential is added to the nominal thread pitch of the outer sleeve 82 thereby decreasing the number of threads in a given linear length. In the preferred embodiment, the outer sleeve thread pitch 132 is set equal to the nominal thread pitch and the total thread pitch differential is subtracted from the nominal inner thread pitch 130.

In a press 10 of the type illustrated in FIG. 1 and described above, Equations 1 through 13 can be used to calculate the necessary thread pitch differential to compensate for Poisson strains exerted on the inner and outer clamp sleeves and the end loading effects. In a preferred embodiment of this type, assuming four solid steel columns each capable of supporting 250,000 kilograms (kg) at maximum full tonnage column stress not to exceed 700 kilograms per square centimeter ($kg/cm^2$) having a diameter, represented as "$D_2$" in FIG. 5, equal to 224 millimeters (mm); a modulus of elasticity, $E_c$, of 21,092 kilograms per square millimeter ($kg/mm^2$); and a Poisson strain ratio, $V_c$, of 0.3; and wherein each clamp assembly has an inner clamping sleeve having an inner radius, $A_1$, of 112.075 mm; a thread root radius, $B_1$, of 125.825 mm; a modulus of elasticity, $E_{is}$, of 21,092 $kg/mm^2$; a Poisson strain ratio, $V_{is}$, of 0.3; an outer clamping sleeve having a thread root radius, $C_1$, of 135.625 mm; an outer radius, $C_2$, of 150.975 mm; a modulus of elasticity, $E_{os}$, of 21,092 $kg/mm^2$; and a Poisson strain ratio, $V_{os}$, of 0.3; an outer housing having an outer radius, $D_1$ illustrated in FIG. 5, of 240 mm; a modulus of elasticity, $E_{oh}$, of 21,092 $kg/mm^2$; and a Poisson ratio, $V_{oh}$, of 0.3; operating at a clamping pressure, P, of 6.3134 $kg/mm^2$; with a radial clearance, $X_1$, between the column and the inner sleeve of 0.0865 mm; and With a radial clearance, $X_{11}$, between the outer sleeve and the housing of 0.055 mm, the total thread pitch differential necessary to compensate for the Poisson strain exerted on the inner and outer sleeves using Equations 1 through 13 listed above is approximately equal to 0.0084 mm which if doubled to transfer the end loading effects is approximately equal to 0.0168 mm. Assuming further an outer sleeve thread pitch set equal to a nominal thread pitch of 16 mm, the inner sleeve thread pitch would then be approximately equal to 15.983 mm.

FIG. 6 illustrates a second embodiment of a clamp assembly 150. The clamp assembly 150 differs from the clamp assembly 50 illustrated in FIGS. 3 through 5 in that an inner threaded surface 152 is formed on an inner surface 154 of a clamp assembly housing 156. The clamp assembly 150 is quite similar to the clamp assembly 50 described above in that similarly referenced elements perform similar functions. The clamp assembly housing 156 includes three sections a lower section 158, a central section 160 and an upper section 162. Like the clamp assembly 50 described above, the lower section 158 and the central section 160 are secured together with suitable fastening means such as a plurality of bolts 164. The upper section 162 is secured to the central section 160 with bolts similar to bolts 62 illustrated in FIG. 5.

When the housing 156 is slidably positioned about the column 14, a chamber 166 is defined between the outer cylindrical surface 67 of the column 14, the upper section 162, the lower section 158 and the inner threaded surface 152. An inner clamp sleeve 168 having a 90° contact angle outer threaded surface 170 is threaded with the inner threaded surface 152 to define a helical chamber 172 about column 14 Helical chamber 172 is sealed at an upper end with appropriate sealing means 174, such as described with the clamp assembly 50 above, while an O-ring 176 provides a suitable seal at a lower end. Pressurization of the helical chamber 172 with suitable fluid from a hydraulic port 163 causes the inner sleeve 168 to displace radially inward under Poisson strain so that an inner surface 171 thereof uniformly engages the outer surface 67 of the column 14.

Like the clamp assembly 50, pressurization of the helical chamber 172 of the clamp assembly 150 causes a change in thread pitch between the outer threaded surface 170 and the inner threaded surface 152. Specifically, an inner thread pitch, defined by double arrow 178, increases slightly due to inward radial displacement of the inner sleeve 168 under Poisson strain against the column 14 while an outer thread pitch 180 decreases slightly due to outward radial displacement of the housing 156 under Poisson strain. The difference in thread pitch, over a longitudinal length of the threaded portion produces a thread gap, not shown, on a second end 182, when there is thread contact on a first end 184 thereof. A substantial load builds up on the corresponding threads of the first end 184 before sufficient load is picked up by corresponding threads of the second end 182.

End effect loading, similar to that described above in reference to the clamp assembly 50, is also present in the second embodiment of clamp assembly 150. This second component of stress is associated with a longitudinal length portion defined by double arrow 188 on the inner sleeve 168.

Since the inner sleeve 168 of clamp assembly 150 is substantially similar to the inner sleeve 80 of clamp assembly 50, Equations 1 through 6 above are used to determine the change in thread pitch associated with Poisson strain of the inner sleeve 168 wherein Equations 3, 4 and 5 are used for a solid column and Equations 3A, 4A and 5A are used for a hollow column.

In contrast, since the clamp assembly 150 does not include a separate outer sleeve surrounded by a cylindrical housing, but rather, a single threaded housing 156, a total radial distance deflection of the housing 156, $X_3$, is represented by the following equation:

$$X_3 = \frac{PC_1}{E_{oh}} \left( \frac{C_2^2 + C_1^2}{C_2^2 - C_1^2} + V_{oh} \right) \qquad \text{Equation 14}$$

where P represents the clamp assembly operating pressure within the helical chamber 172; $C_1$ represents a radial distance from the center of the column 14 to the outermost channel, or thread root, of the housing 156; $C_2$ represents an outer radial distance of the housing 156; and $V_{oh}$ and $E_{oh}$ represent the Poisson strain constant and modulus of elasticity for the material comprising the housing 156.

From Equation 14 and determination of $X_3$, a change in thread pitch for the housing 156 that is associated with Poisson strain, $\Delta T_o$, is represented by the following equation:

$$\Delta T_o = \frac{X_3(V_{os})T}{C_2} \qquad \text{Equation 15}$$

where T represents the nominal thread pitch of the inner sleeve 168 which corresponds to the nominal thread pitch of the housing 156.

From Equation 6 and Equation 15, a total thread pitch differential due to the Poisson strains exerted upon the inner sleeve 168 and the housing 156 can be determined according to Equation 13 above. In the preferred embodiment, the amount determined from Equation 13 is doubled to compensate for end effect loading. This total thread pitch differential can then be apportioned between the inner thread pitch 178 and the outer thread pitch 180 in any desired manner wherein a portion of the total thread pitch differential is subtracted from the nominal thread pi&:ch of the inner sleeve 168 and the remaining portion of the total thread pitch differential is added to the nominal thread pitch of the housing 156.

In summary, the present invention provides an improved threaded column clamp assembly that includes a thread pitch differential between the inner and outer threaded clamping portions whether the threads are incorporated on the clamping assembly housing or as separate sleeve inserts. The thread pitch differential compensates for Poisson strain of the inner and outer threaded portions during clamping operation. Additional thread pitch differential between the inner and outer threaded portions is added to transfer end effect loading.

Although the present invention has been described with reference to preferred embodiments, workers skilled in the art will recognize that changes may be made in form and detail without departing from the spirit and scope of the invention.

What is claimed is:

1. A clamp assembly for selectively clamping to a column, the clamp assembly comprising:
    a threaded inner clamp portion positioned concentrically around the column, the threaded inner clamp portion having an inner surface for selectively engaging the column and a threaded outer surface having an inner clamp thread pitch;
    a threaded outer clamp portion having a threaded inner surface with an outer clamp thread pitch, the inner and outer threaded surfaces mating concentrically about the column with sufficient clearance to define a selectively pressurized chamber and having a difference in thread pitch between the inner clamp thread pitch and the outer clamp thread pitch.

2. The clamp assembly of claim 1 wherein the threaded inner clamp portion and the threaded outer clamp portion are deformable, the threaded inner clamp portion deforming from radial inward displacement upon pressurizing the chamber, the threaded outer clamp portion deforming from radial outward displacement upon pressurizing the chamber.

3. The clamp assembly of claim 2 wherein the threaded inner clamp portion includes an unthreaded inner clamp portion extending cylindrically from an end of the threaded inner clamp portion and having an inner surface for selectively engaging the column.

4. The clamp assembly of claim 1 wherien the column includes a center hollow cylindrical portion.

5. A clamp assembly for selectively clamping to a column, the assembly comprising:
    a clamp sleeve slidable longitudinally with respect to the column, the clmap sleeve having an outer surface and an inner surface having a cross-section mating a cross-section of said column for selectively engaging said column;
    a housing portion positioned about the clamp sleeve and having a first portion mating with the clamp sleeve and which in combination with the outer surface of the clamp sleeve defines a sealed chamber therebetween surrounding the clamp sleeve;
    means for limiting movement of the clamp sleeve longitudinally with respect to the housing portion including a plurality of longitudinally spaced, laterally engaged surfaces respectively on the outer surface of the clamp sleeve and on the first portion of the housing portion, comprising an inner threaded portion on the clamp sleeve having an inner clamp thread pitch and an outer threaded portion on the housing portion having an outer clamp thread pitch, said inner and outer threaded portions mating concentrically about the column with sufficient clearance to define the chamber and having a difference in thread pitch between the inner clamp thread pitch and the outer clamp thread pitch; and
    means for selectively supplying pressurized fluid to the chamber between the housing portion and the clamp sleeve which causes the clamp sleeve to displace radially inward so that the inner surface thereof engages the column to secure the clamp sleeve and housing portion with respect to the column.

6. The clamp asselby of claim 5 wherein the clamp sleeve and the housing portion are deformable, the clamp sleeve deforming from radial inward displacement upon pressurizing the chamber, the housing portion deforming from radial outward displacement upon pressurizing the chamber.

7. The clamp assembly of claim 6 wherein the clamp sleeve includes an unthreaded inner clamp portion extending cylindrically from an end of the clamp sleeve and having an inner surface for selectively engaging the column.

8. The clamp assembly of claim 5 wherein the outer threaded portion comprises an outer clamp sleeve positioned adjacent an inner surface of the housing portion, the outer clamp sleeve displacing radially outward with selective pressurization of the chamber to engage the inner surface of the housing portion.

9. The clamp assembly of claim 5 wherein the threaded inner and outer portions are designed to constitute a 90° contact angle buttress thread with respect to a longitudinal axis of the column.

10. A clamp assembly for selectively clamping a crosshead from relative longitudinal movement with respect to a stationary member of a press having a plurality of columns, the clamp assembly comprising:
    a housing portion slidably fitted about each column, each housing portion being fixedly secured to a portion of the press and having a chamber therein positioned concentrically about its respective column;
    an inner threaded clamp sleeve positioned concentrically about the column within the chamber of the housing portion, the inner threaded clamp sleeve being slidable longitudinally with respect to the column and having an outer threaded surface with an inner clamp thread pitch and an inner generally cylindrical surface for engaging the column;
    an outer threaded clamp sleeve positioned within the chamber concentrically about the, column and the inner threaded clamp sleeve, the outer threaded clamp sleeve being fixed longitudinally with respect to the housing portion and the outer threaded clamp sleeve having an inner threaded surface having an outer clamp thread pitch that is different than the inner clamp thread pitch, the inner threaded surface engaging the outer threaded surface to limit longitudinal movement of the inner threaded clamp sleeve with respect to the outer threaded clamp sleeve; and
    fluid pressure means for selectively introducing pressurized fluid into the chamber and specifically between the inner threaded surface and the outer threaded surface to cause the inner generally cylindrical surface of the inner threaded clamp sleeve to be urged against the column.

11. The clamp assembly of claim 10 the outer clamp thread pitch is greater than the inner clamp thread pitch.

12. The clamp assembly of claim 11, wherein the inner threaded clamp sleeve and the outer threaded clamp sleeve are deformable, the inner threaded clamp sleeve deforming from radial inward displacement upon pressurizing the chamber, the outer threaded clamp sleeve deforming from radial outward displacement upon pressurizing the chamber.

13. The clamp assembly of claim 12 wherein the inner threaded clamp sleeve further comprises an inner unthreaded portion extending cylindrically from an end of the inner threaded clamp sleeve and having an inner surface for selectively engaging the column.

14. The clamp assembly of claim 1 wherein the outer clamp thread pitch is greater than the inner clamp thread pitch.

15. The clamp assembly of claim 1 wherein the threaded inner and outer portions are designed to constitute a 90° contact angle buttress thread with respect to a longitudinal axis of the column.

16. The clamp assembly of claim 5 wherein the outer clamp thread pitch is greater than the inner clamp thread pitch.

* * * * *

UNITED STATES PATENT AND TRADEMARK OFFICE
CERTIFICATE OF CORRECTION

PATENT NO. : 5,160,750
DATED : November 3, 1992
INVENTOR(S) : JAMES D. HOLBROOK It is certified that error appears in the above-identified patent and that said Letters Patent is hereby corrected as shown below:

Col. 13, line 3, delete "pi&:ch", insert "pitch"

Col. 13, line 55, delete "clmap", insert "clamp"

Col. 14, line 18, delete " asselby", insert "assembly"

Col. 14, line 56, after "the", delete ","

Col. 15, line 5, after "claim 10", insert "wherein"

Col. 15, line 8, after "claim 11", delete ","

Signed and Sealed this

Fifth Day of October, 1993

Attest:

BRUCE LEHMAN

*Attesting Officer*   *Commissioner of Patents and Trademarks*